United States Patent Office 3,428,587
Patented Feb. 18, 1969

3,428,587
METHOD OF PREPARING LINEAR CONDENSATION POLYESTER RESINS HAVING IMPROVED STABILITY
Aleksander Piirma, Stow, Ohio, assignor to The Goodyear Tire & Rubber Company, Akron, Ohio, a corporation of Ohio
No Drawing. Continuation of application Ser. No. 369,605, May 22, 1964. This application Mar. 13, 1968, Ser. No. 712,865
U.S. Cl. 260—22             6 Claims
Int. Cl. C08g 51/62, 39/04

ABSTRACT OF THE DISCLOSURE

Linear condensation polyesters having improved stability are produced through polycondensation of glycol esters of at least one organic dicarboxylic acid by heating the same under reduced pressure in the presence of a stabilizing amount of an alkali or alkaline earth metal salt of a lower aliphatic carboxylic acid.

---

The application is a continuation of my prior filed application; Ser. No. 369,605, filed May 22, 1964, now abandoned.

This invention relates to an improvement in condensation polyester resins and to a method for preparing condensation polyesters having improved stability.

Polymeric polyesters are derived from glycols and dicarboxylic acids or ester forming derivatives thereof. Commonly such polymeric polyesters are made by reacting a di-ester of a dicarboxylic acid such as a dialkyl ester with a glycol in the presence of an ester interchange catalyst to form the glycol esters which are condensed to produce highly polymeric polyester. Alkaline compounds are known to be excellent ester interchange catalysts. However, polymeric polyesters made from glycol esters prepared by ester interchange reaction using such alkaline materials as catalysts do not have very good resistance to degradation by heat or to degradation on exposure to hydrolytic conditions.

In view of this it was surprising to find that polymeric polyesters having very low color and improved stability can be produced by adding a lower aliphatic carboxylic acid salt of an alkali metal or of an alkaline earth metal to glycol esters of organic dicarboxylic acids and then condensing the glycol esters to form highly polymeric polyesters.

The invention is particularly directed to manufacturing improved polymers for the production of films and fibers in which the formation of yellow or brown colors in the resin is undesirable. Thus it is an object of the invention to produce polyester resins having a very low degree of color. Another object is to produce polyester resins of improved stability. Another object is to provide a method for producing polyester resins which have a low degree of color and which also have improved thermal and hydrolytic stability. Other objects will appear as the description of the invention proceeds.

In the examples below one mol of dimethyl terephthalate and from 2.2 to 3.0 mols of ethylene glycol were placed in a glass flask, stirred and heated at 197 to 230° C. at atmospheric pressure in the presence of the catalysts indicated until the theoretical amount of methanol releasable from the dimethyl terephthalate was collected in a receiver. At this point the ester interchange or glycolysis reaction was considered complete. The pressure in the system was then slowly reduced to 1 millimeter of mercury pressure over a period of 15 to 30 minutes and the temperature was raised to 280° C. The condensation reaction was carried out at 280° C. and 1 millimeter of mercury pressure for the period of time indicated in the table. The amount of the alkali metal compound or alkaline earth metal compound added and the point at which it was added are shown in the table below which also shows the specific variations made in the process in preparing the polyesters and the viscosity of the aged samples were determined. The decrease in intrinsic viscosity expressed as percent broken bonds gives a measure of the stability of the resin.

The equation for calculating the percent broken bonds (BB) is $$\text{Percent } BB = \frac{K[N]_o - [N]_a}{[N_o][N]_a}$$

where $K$ = a variable dependent on the molecule weight-intrinsic viscosity relationship $[N]_o$ = intrinsic viscosity of the initial sample
$[N]_a$ = intrinsic viscosity of the aged sample Intrinsic viscosity of each of the samples was determined in a 60/40 phenol-tetrachloroethane mixed solvent at 30.0° C.

TABLE I

| Ex. No. | Catalyst | Percent by Wt. of Ester Charge | Stabilizer | Percent by Wt. of Ester Charge | Time of Addition | Polymer I.V.[1] | Color | Melting Point, °C. | Thermal[2] Stability, Percent B.B. |
|---|---|---|---|---|---|---|---|---|---|
| 1 | ZnAc₂·2H₂O / Sb₂O₃ | 0.036 / 0.025 | None | | | 0.814 | 1.5 | 259 | 0.11 |
| 2 | ZnAc₂·2H₂O / Sb₂O₃ | 0.036 / 0.025 | CaAc₂·H₂O | 0.030 | Before start of glycolysis reaction | 0.986 | 1.5 | | 0.12 |
| 3 | ZnAc₂·2H₂O / Sb₂O₃ | 0.036 / 0.025 | CaAc₂H₂O | 0.015 | After completion of glycolysis reaction | 0.774 | 1.0 | 264 | 0.09 |
| 4 | ZnAc₂·2H₂O / Sb₂O₃ | 0.036 / 0.025 | CaAc₂·H₂O | 0.025 | do | 0.803 | 1.0 | | 0.06 |
| 5 | ZnAc₂·2H₂O / Sb₂O₃ | 0.036 / 0.025 | CaAc₂·H₂O | 0.030 | do | 0.806 | 1.5 | 264 | 0.075 |
| 6 | ZnAc₂·2H₂O / Sb₂O₃ | 0.036 / 0.025 | CaAc₂·H₂O | 0.060 | do | 0.755 | 0.75 | 263 | 0.07 |
| 7 | ZnAc₂·2H₂O / Sb₂O₃ | 0.036 / 0.025 | CaAc₂·H₂O | 0.109 | do | 0.503 | 1.0 | | 0.06 |
| 8 | ZnAc₂·2H₂O / Sb₂O₃ | 0.036 / 0.025 | CaAc₂·H₂O | 0.030 | End of poly-condensation | 0.812 | 1.0 | | 0.13 |
| 9 | PbAc₂ / Mn-glycolate / Sb₂O₃ | 0.015 / 0.015 / 0.025 | CaAc₂·H₂O | 0.030 | After completion of glycolysis reaction | 0.706 | 2+ | | 0.03 |
| 10 | ZnAc₂·2H₂O / Sb₂O₃ | 0.036 / 0.025 | NaAc | 0.030 | do | 0.867 | | | 0.08 |

[1] I.V. is an abbreviation used for intrinsic viscosity. CaAc₂ = Calcium Acetate. NaAc = Sodium Acetate. [2] The thermal stability of each of the samples was determined as follows: a sample of the resin was ground to pass a 20 mesh screen and dried for 16 hours at 135° C. and 1 millimeter of mercury pressure. The dried sample was placed in a Petri dish and aged at 200° C. in an electrically heated oven in the presence of air for 1 day. Intrinsic viscosities of the samples were determined and the percent broken bonds calculated.

The data of the above table clearly demonstrate that polyesters of improved properties are produced when the stabilizer is added after the ester interchange or glycolysis reaction is complete and before the resin is fully polymerized. The stabilizers are preferably added to the ester interchange or glycolysis product or its equivalent polyester forming material before it is condensed to form high molecular weight polymeric polyester resin. However, they can be added to low molecular weight polymer having an intrinsic viscosity of less than 0.4 and the low molecular weight polymer can be condensed to form high molecular weight polymers of improved stability.

The invention has been illustrated particularly with respect to stabilizing a polymeric ethylene terephthalate. It is also effective in stabilizing other condensation polyester resins. Representative examples of such condensation polyester resins are resins derived from dicarboxylic acids or ester forming derivatives thereof and glycols, for example, polytetramethylene terephthalate, polycyclohexylene dimethylene terephthalate, polyethylene bibenzoate and copolyesters such as copolyesters of aromatic dicarboxylic acids such as ethylene terephthalate-ethylene isophthalate copolyester, ethylene terephthalate-ethylene 2,6-naphthalate, copolyester and copolyesters of an aromatic dicarboxylic acid with an aliphatic dicarboxylic acid such as ethylene terephthalate, ethylene adipate copolyesters and ethylene terephthalate, ethylene sebacate copolyesters. Representative examples of dicarboxylic acids from which the resins can be derived are aliphatic dicarboxylic acids such as adipic acid, sebacic acid and azelaic acid; aromatic dicarboxylic acids such as orthophthalic acid, isophthalic acid, terephthalic acid, 2,5-dichloroterephthalic acid, bibenzoic acid and the naphthalic acids. The resins can be made from various glycols including glycols such as the propylene glycols, the butylene glycols, pentamethylene glycol, hexamethylene glycol, decamethylene glycol, diethylene glycol and 1,4-cyclohexane dimethanol. The invention is also applicable to copolyesters containing two or more dicarboxylic acid units and/or two or more glycol units. Ethylene glycol is a preferred glycol because of its low cost and ready availability.

The glycol esters can be prepared by the ester interchange method in which alkyl esters of the acids are reacted with a glycol in the presence of an ester interchange catalyst, by the reaction of the acid with glycol, by reacting ethylene oxide with the acid or by any other suitable method. When the ester interchange method is used to prepare the bis glycol esters, catalysts such as soluble zinc compounds, for example, zinc salts of fatty acids or soluble manganese compounds such as manganese salts of fatty acids are preferred. In carrying out the process of the invention the glycol esters are condensed in the presence of a condensation catalyst and the stabilizer. Catalysts suitable for the condensation reactions by which the high molecular weight polyesters are prepared are soluble antimony compounds such as antimony trioxide, lead compounds such as lead acetate, litharge and titanium compounds such as titanic acid and glycol titanates.

The stabilizers of the invention are alkali metal and alkaline earth metal salts of lower aliphatic acids, such as lithium, potassium, sodium, calcium, barium and strontium salts of lower aliphatic acids containing 1 to 6 carbon atoms. Representative examples of such salts are lithium formate, lithium acetate, lithium propionate, lithium butyrate, lithium valerates, lithium caproate, potassium formate, potassium propionate, potassium acetate, potassium caproate, sodium formate, sodium acetate, sodium propionate, sodium caproate, calcium formate, calcium acetate, calcium propionate, calcium butyrate, calcium valerate and calcium caproate, barium formate, barium acetate, barium proprionate, barium butyrate, barium valerate, barium caproate, strontium formate, strontium propionate, strontium butyrate, strontium valerate and strontium caproate.

The amount of stabilizer used can be varied over a wide range of concentrations. Generally the amount used will be from 0.01 to 0.5 percent by weight of the polyester resin used. The preferred amounts usable will be in the range of from 0.02 to 0.3 percent by weight of the polyester resin to obtain optimum stability in the resin.

The reactions by which the resins are prepared are carried out in accordance with the usual known techniques. Thus the reactions are preferably carried out in the absence of oxygen, generally in an atmosphere of inert gas such as nitrogen or the like. The condensation reaction is carried out under reduced pressure, generally below 10 millimeters of mercury pressure, and usually at or below 1 millimeter of mercury pressure at a temperature in the range of from about 260 to 290° C.

While certain representative embodiments and details have been shown for the purpose of illustrating the invention, it will be apparent to those skilled in this art that various changes and modifications may be made therein without departing from the spirit or scope of the invention.

What I claim is:
1. A process for preparing linear condensation polyesters having improved stability which comprises forming glycol esters of at least one organic dicarboxylic acid, adding a stabilizing amount of a compound selected from the group consisting of alkali and alkaline earth metal salts of lower aliphatic carboxylic acids and condensing the glycol esters with elimination of glycol at a temperature of from 260 to 290° C. at a pressure of about one millimeter of mercury pressure to form a polymeric polyester having an intrinsic viscosity of at least 0.4.

2. The process of claim 1 in which the glycol ester formed is bis glycol terephthalate.

3. The process of claim 1 in which the compound used is selected from the group consisting of sodium acetate and calcium acetate.

4. A process for preparing linear condensation polyesters having improved stability which comprises reacting a dialkyl ester of an organic dicarboxylic acid with a glycol in the presence of an ester interchange catalyst to form the glycol esters of the acid, adding from 0.01 to 0.5 percent by weight, based on the glycol esters, of a component selected from the group consisting of sodium acetate and calcium acetate, and condensing the glycol esters with elimination of glycol at a temperature of from 260 to 290° C. at a pressure of about one millimeter of mercury pressure to form a polymeric polyester having an intrinsic viscosity of at least 0.4.

5. The process of claim 4 in which the dialkyl ester used is dimethyl terephthalate.

6. The process of claim 5 in which the glycol used is ethylene glycol.

References Cited

UNITED STATES PATENTS

| | | | |
|---|---|---|---|
| 2,758,105 | 8/1956 | Alles et al. | 260—75 |
| 2,829,153 | 4/1958 | Vodonik | 260—75 |
| 3,070,575 | 12/1962 | Cramer | 260—75 |
| 3,079,368 | 2/1963 | Lundberg | 260—75 |
| 3,161,710 | 12/1964 | Turner | 260—75 |

FOREIGN PATENTS

| | | |
|---|---|---|
| 564,046 | 9/1958 | Canada. |
| 574,113 | 4/1959 | Canada. |

DONALD E. CZAJA, Primary Examiner.

R. W. GRIFFIN, Assistant Examiner.

U.S. Cl. X.R.

260—45.85